United States Patent Office 3,235,822
Patented Feb. 15, 1966

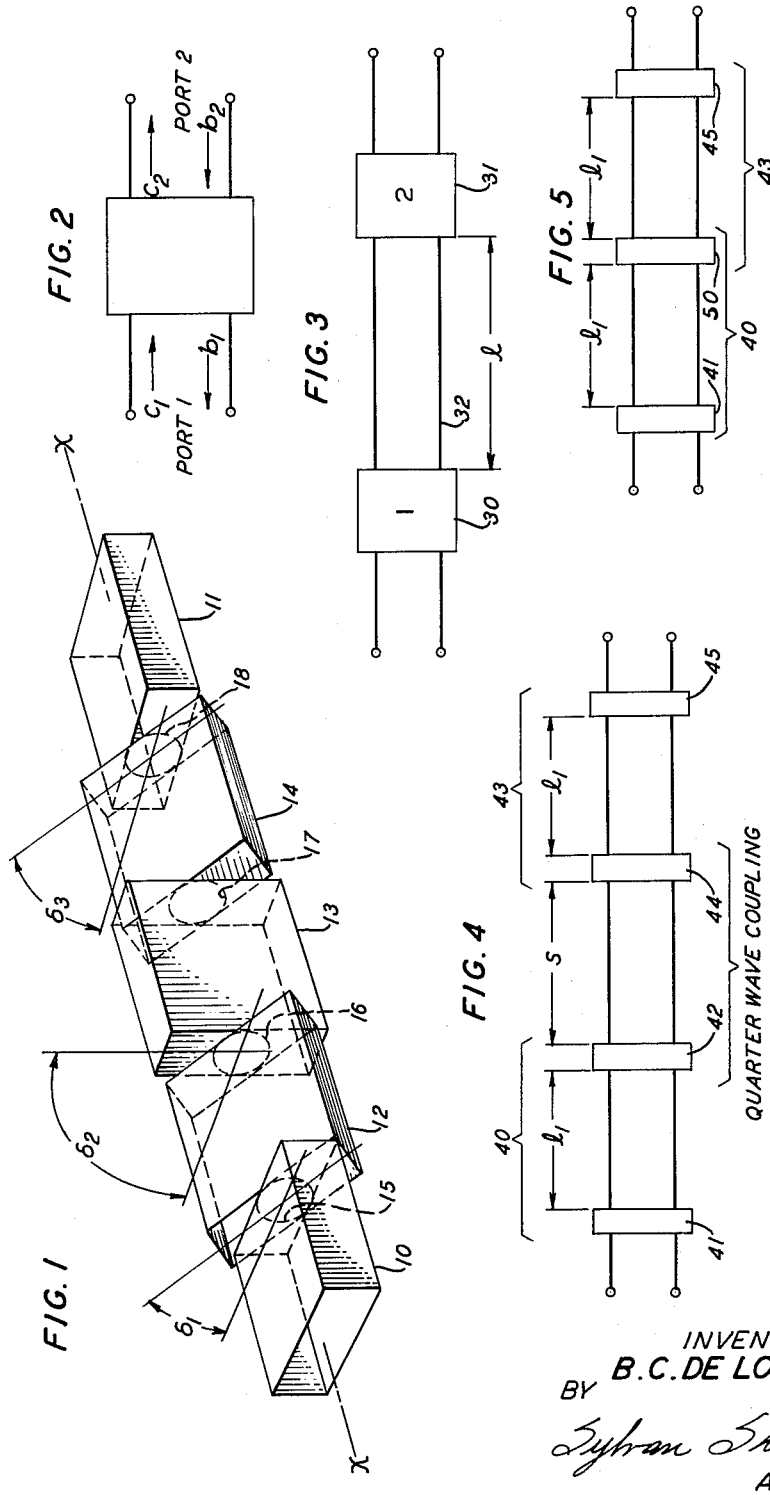

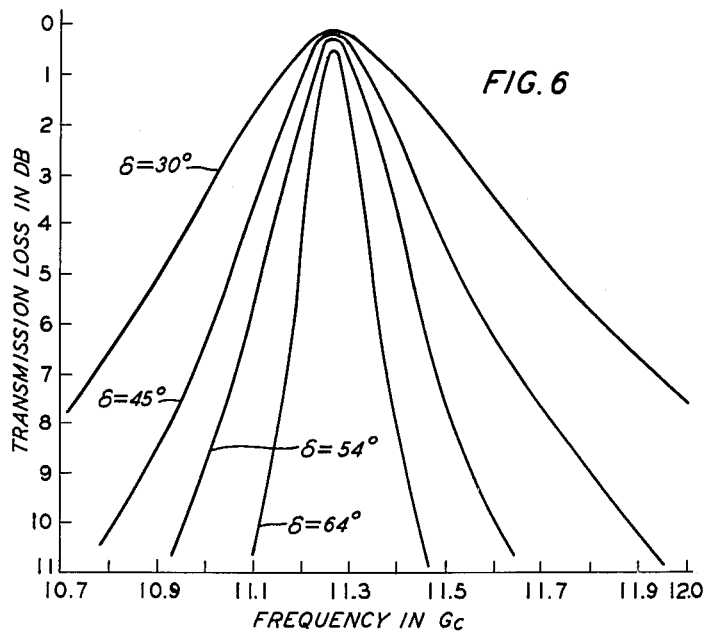
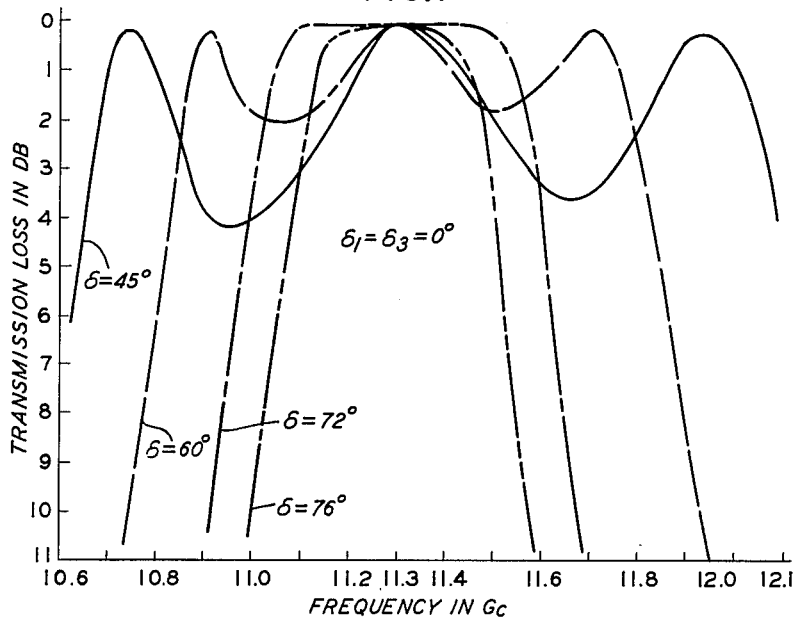

3,235,822
DIRECT-COUPLED STEP-TWIST JUNCTION WAVEGUIDE FILTER
Bernard C. De Loach, Jr., Little Silver, N.J., assignor to Bell Telephone Laboratories, Incorporated, New York, N.Y., a corporation of New York
Filed May 6, 1963, Ser. No. 278,141
5 Claims. (Cl. 333—73)

This invention relates to electromagnetic wave filters and, more particularly, to direct-coupled bandpass filters using step-twist junctions.

The conventional waveguide filter comprises a section of uniform guide bounded by two discontinuities. An analysis of the operation of a filter so constructed involves a consideration of the phase and amplitude of the energy reflected by the individual discontinuities. With a simple inductive or capacitive iris, reflections at each discontinuity appear to come from a pure, lumped susceptance, and both the phase and amplitude of the reflected energy vary in a related manner as the physical dimensions of the iris are varied. One, therefore, designs the geometry of the discontinuities for a particular bandwidth and tunes the cavity to the desired resonant frequency by suitably spacing the discontinuities. While it is a relatively simple matter to adjust the tuning of such a filter by means of a tuning screw inserted into the cavity, it is a relatively difficult and lengthy procedure, involving machine shop work on the irises, to make changes in the bandwidth of the filter.

In multiple-cavity, quarter-wave-coupled filters, these difficulties are, of course, compounded. However, as the several cavities in a quarter-wave-coupled filter are themselves separate filters, each of which can be independently adjusted, the desired over-all filter characteristic can be obtained by separately adjusting the individual cavities. For such a filter, the over-all response can readily be predicted by summing the responses of the individual cavities.

This separability, however, is lost in a direct-coupled filter, thus materially complicating its design and adjustment. For this reason, it is difficult to obtain estimates of the effect of departures from design and, hence an extra degree of precision is, in general, required in their construction.

In addition to the above-mentioned design and construction considerations, it has been virtually impossible until recently to construct multiple-cavity filters having readily adjustable bandpass characteristics.

In United States Patent 2,968,771, issued to applicant on January 17, 1961, there is disclosed a method for constructing adjustable, multiple-cavity, quarter-wave-coupled filters employing step-twist, junctions and corrective irises. As explained therein, the step-twist junction has a complex admittance which makes it possible to independently control the amplitude and phase of the reflected wave energy and, hence, to construct adjustable multiple-cavity filters.

It is the object of the present invention to construct multiple-cavity, direct-coupled filters.

It is a further object of the invention to construct direct-coupled filters having adjustable transmission characteristics.

It has been discovered that a direct-coupled filter can be constructed employing step-twist junctions and corrective irises. In accordance with the invention, a plurality of rotatable sections of rectangular waveguide are coaxially interposed along a common longitudinal axis between a pair of fixed sections of rectangular waveguide. The various sections of waveguide are preferably coupled through circular irises whose centers also lie along the common axis.

It is a property of such a filter that regardless of the manner in which the several sections are rotated with respect to each other about the common axis, a symmetric bandpass characteristic is obtained, which characteristic can be varied, without changing the center frequency of the filter, simply by rotating one or more of the sections. This permits a single direct-coupled filter to generate a tremendous variety of filter characteristics all centered at the same frequency. This also makes possible the direct synthesis of a given filter response curve without resort to an elaborate design technique. Thus, it is a matter of a few minutes work, with a swept-frequency-oscillator, to make electrical adjustments to obtain, for example, a multiple-cavity, direct-coupled filter having a given bandwidth and a given ripple in the passband, as opposed to the usual procedure of first obtaining low frequency prototype parameters, then obtaining the equivalent microwave structure parameters, machine shop execution of the design, and, finally, testing and tuning up the resulting piece of hardware. Furthermore, if the selectivity of the filter in actual use turns out to be inappropriate, it is again a matter of a few minutes work to change the bandwidth of a filter constructed in accordance with the invention to another value having the same or some other prescribed ripple. With prior art techniques this would, of course, require a completely new filter. Thus, a direct-coupled filter constructed in accordance with these teachings allows the experimenter a tremendous flexibility in, and rapid attainment of, desired filter responses.

It is a further feature of the invention, that each of the rotatable sections can be physically identical and, contrary to the usual situation in direct-coupled filters, each of the individual cavities can be separately and independently designed and adjusted.

It is an advantage of a direct-coupled filter, that it is substantially shorter than a quarter-wave-coupled filter. It is a further advantage that the spurious passbands associated with a direct-coupled filter are further removed from the desired passband than they would be in a comparable quarter-wave-coupled filter. Thus, the principle of a direct-coupled filter, in accordance with the invention, can be advantageously employed in situations which do not normally require adjustment. Such filters can, therefore, be constructed with the intermediate sections rotated a fixed amount and without means for varying the angle of rotation.

(The term "quarter"-wave-coupled as used above and as used hereinafter shall be understood to include both quarter-wave coupling and odd multiples of quarter-wave coupling.)

These and other objects and advantages, the nature of the present invention, and its various features, will appear more fully upon consideration of the various illustrative embodiments now to be described in detail in connection with the accompanying drawings, in which:

FIG. 1 is an illustrative embodiment of the invention showing a three cavity, direct-coupled filter;

FIG. 2, given for purposes of explanation, shows a two-port network;

FIG. 3, given for purposes of explanation, shows a resonator comprising two, two-port networks connected by a length of line;

FIG. 4 shows a two-cavity, quarter-wave-coupled filter;

FIG. 5 shows the equivalent two-cavity, direct-coupled filter;

FIG. 6 is illustrative of the variety of bandpass responses obtainable with a single cavity step-twist filter; and FIGS. 7 and 8 are illustrative of the variety of bandpass responses obtainable with a three-cavity, direct-coupled, step-twist-junction filter for different angular positions of the cavities.

Figure 8:
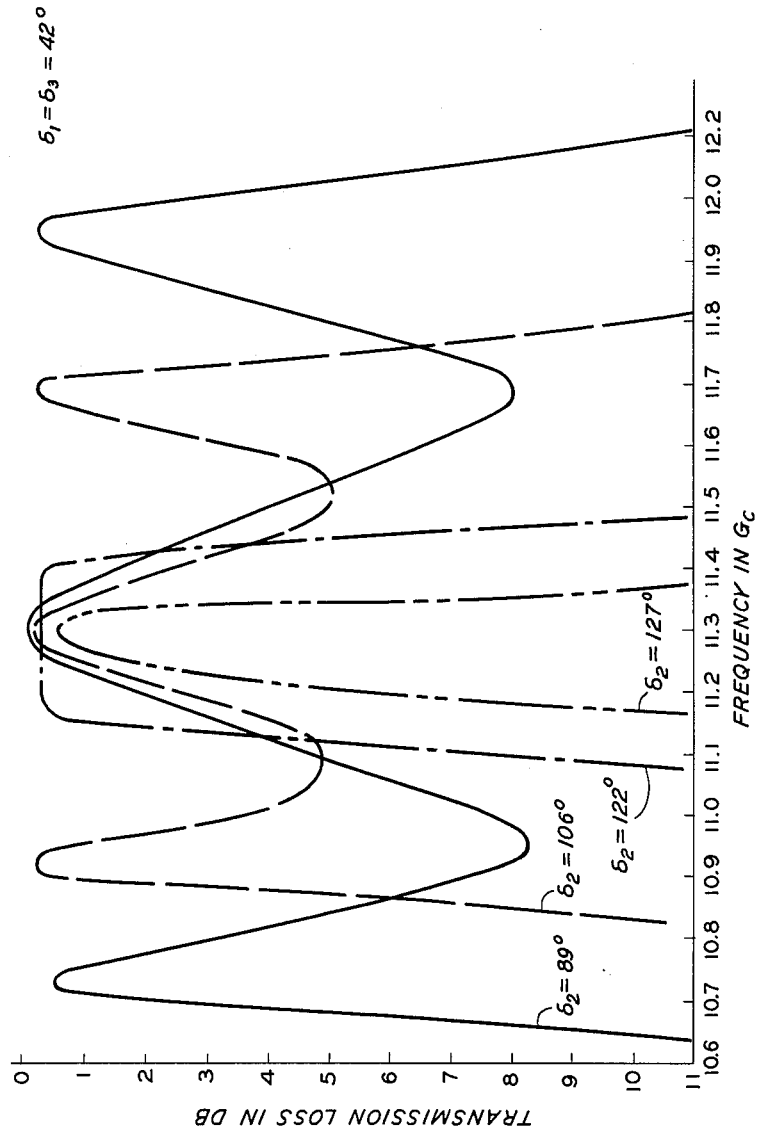

Referring to FIG. 1, there is shown a direct-coupled step-twist-junction filter, in accordance with the invention, comprising a pair of fixed sections 10 and 11 and a plurality of rotatable sections 12, 13 and 14, of dominant mode, rectangular waveguide. The sections are coaxially aligned and longitudinally spaced along a common longitudinal axis $x$—$x$. The "fixed" designation associated with sections 10 and 11 refers to the fact that these two sections maintain a constant orientation with respect to each oher.

Interposed between the fixed guides 10 and 11 are the plurality of rotatable sections 12, 13 and 14 of rectangular waveguide. In the illustrative embodiment of FIG. 1 three sections are shown. However, it is understood that fewer or more sections can be used if required.

When in place between fixed guides 10 and 11, the cofacing ends of sections 10, 11, 12, 13 and 14 abut upon each other to form four step-twist junctions. The rotation of each of the guides 12, 13 and 14 about the longitudinal axis $x$—$x$ is measured in degrees $\delta_1$, $\delta_2$ and $\delta_3$ between corresponding sides of the respective rotatable guide and either of the fixed guides.

Coupling between cofacing ends of adjacent sections of guide is accomplished through circular irises whose centers are located along the $x$—$x$ axis and whose diameters are preferably equal to the narrow dimension of the guides. Since each of the guides shares a common iris with the next adjacent guide, four such irises 15, 16, 17 and 18 are utilized in the embodiment of FIG. 1.

As will be explained hereinbelow, a step-twist junction with circular iris has the basic properties of a constant-phase two-port network. Hence, operation of the direct-coupled, step-twist-filter can best be understood by first considering the properties of a cascade of "constant-phase" two-port networks of the type shown in FIG. 2. In particular, it will be shown that two such networks, suitably spaced, define a single cavity filter of fixed center frequency and variable bandwidth. It will be further shown, that when two such cavities are cascaded by means of an appropriate length of line to form a quarter-wave-coupled filter, the adjacent two-ports and the connecting length of line can be replaced by a single two-port to form a direct-coupled filter of fixed frequency and variable bandwidth.

A "constant-phase" two-port is defined as a network that is lossless, reciprocal, symmetrical, and has the property that its voltage reflection coefficient is represented by $$R = |R|e^{j\theta} \qquad (1)$$

for all frequencies, where $|R|$ and $\theta$ are independent of frequency, where $|R|$, in general, varies between zero and one, and where $\theta$ is a constant, independent of R.

For such a two-port, the normalized voltage waves $c_1$ and $c_2$ shown traveling to the right in FIG. 2 at ports 1 and 2, respectively, and the normalized voltage waves $b_1$ and $b_2$ traveling to the left, are related by the matrix equation $$\begin{bmatrix} c_1 \\ b_1 \end{bmatrix} = [A] \begin{bmatrix} c_2 \\ b_2 \end{bmatrix} \qquad (2)$$

where the matrix $|A|$ is given in terms of the voltage reflection coefficient R and the transmission coefficient T of the two-port by $$[A] = \frac{1}{T}\begin{bmatrix} 1 & -R \\ 1 & -e^{j\theta} \end{bmatrix} \qquad (3)$$

Two such two-ports can be cascaded by a length of lossless transmission line whose [A] matrix is given by $$[A]_{line} = \begin{bmatrix} e^{j\beta l} & 0 \\ 0 & e^{-j\beta l} \end{bmatrix} \qquad (4)$$

FIG. 3 shows two constant-phase two-ports 30 and 31 separated by a length of line 32. Assuming that the two-ports have the same $\theta$, that is, the irises are the same, but generally different coefficients of reflection and transmission, the wave matrix of the cascade is given as the matrix product of the individual elements. This, for the elements defined above, is $$A_{total} = \frac{e^{j\beta l}}{T_1 T_2 e^{(j\varphi_1 + \varphi_2)}}$$
$$\begin{bmatrix} 1 - R_1 R_2 e^{2j(\theta - \beta l)} & (-R_2 + R_1 e^{2j(\theta - \beta l)})e^{j\theta} \\ (R_1 - R_2 e^{2j(\theta - \beta l)})e^{j\theta} & -R_1 R_2 e^{2j\theta} + e^{2j(\theta - \beta l)} \end{bmatrix} \qquad (5)$$

where the subscript 1 refers to two-port 30 on the left of FIG. 3 and the subscript 2 refers to two-port 31 on the right, and where $\phi_1$ and $\phi_2$ are the phase angles of the transmission coefficients $T_1$ and $T_2$, respectively.

The complex voltage transmission and reflection coefficients of the cascade can be written as $$\begin{aligned} T_{total} &= \frac{1}{A_{11}} = \frac{T_1 T_2 e^{j(\varphi_1 + \varphi_2 - \beta l)}}{1 - R_1 R_2 e^{2j(\theta - \beta l)}} \\ R_{total\ (1)} &= \frac{A_{21}}{A_{11}} = \frac{(R_1 - R_2 e^{2(\theta - \beta l)})e^{j\theta}}{1 - R_1 R_2 e^{2j(\theta - \beta l)}} \\ R_{total\ (2)} &= \frac{-A_{12}}{A_{11}} = \frac{(R_2 - R_1 e^{2j(\theta - \beta l)})e^{j\theta}}{1 + R_1 R_2 e^{2j(\theta - \beta l)}} \end{aligned} \qquad (6)$$

where $R_{total(1)}$ is the reflection coefficient of the cascade from the end containing two-port 30 and $R_{total(2)}$ the reflection coefficient from the end containing two-port 31.

The coefficients are observed to have the remarkable property that their amplitudes are symmetrical about the same set of frequencies (obtained from $$(\theta - \beta l) = \frac{k\pi}{2}$$

where $k$ is any integer) for all values of $R_1$ and $R_2$.

Since $\theta$ is independent of $R_1$ and $R_2$, it can be seen from Equations 6 that the employment of identical constant-phase two-ports allows one to build a resonator, such as is shown in FIG. 3, with fixed resonant frequency, variable bandwidth and constant "excess-phase" where the "excess-phase" is given by $(\pi - \theta)$. (For a discussion of the term "excess-phase" see W. W. Mumford, "Maximally-Flat Filters in Waveguide," Bell System Technical Journal, vol. 27, pages 684–713, October 1948.)

Furthermore, since resonators of the type shown in FIG. 3 can be constructed for which the excess-phase is a constant and is, furthermore, equal for all resonators, it is a relatively simple matter to cascade a plurality of them by connecting them with suitable lengths, $s$, of transmission line to obtain the multiple-cavity, quarter-wave filter of the type described in the above-mentioned United States patent and shown in FIG. 4. The first cavity 40 comprises two-port 41 and two-port 42 and the length of line $l_1$. The second cavity 43 comprises two-port 44 and two-port 45 and a second length of line $l_1$ therebetween.

The two cavities 40 and 43 are connected by the length of line $s$ to form a quarter-wave-coupled filter. The electrical length of the coupling line is given by $$\beta s = \left(\theta - \frac{\pi}{2}\right) \qquad (7)$$

In accordance with the present invention, the adjacent two-ports 42 and 44 and the interconnecting length of line, $s$, are combined into a single discontinuity having the same reflection coefficients and, excepting a possible change in sign, the same transmission coefficient. Substituting Equation 7 for the length of line between adjacent two-ports in Equation 4, we get for the equivalent coefficient of reflection $$R_{total} = \left(\frac{R_1 + R_2}{1 + R_1 R_2}\right) e^{j\theta} \qquad (8)$$

Since $R_1$ and $R_2$ are constants, Equation 8 has precisely the same form as Equation 1. Accordingly, we may replace the two adjacent two-ports 42 and 44 and the inter-connecting length of line, $s$, with a single constant-phase, two-port having the same $\theta$ but with the magnitude given in Equation 8. Thus, the filter response obtained by the quarter-wave-coupled configuration can be duplicated by the direct-coupled configuration using a smaller number of constant-phase two-ports separated by equal lengths of line.

This is illustrated in FIG. 5 which shows an equivalent two cavity, direct-coupled filter. Cavity 40, of FIG. 4, now comprises two-port 41, length of line $l_1$, and the equivalent two-port 50. Cavity 43 now comprises two-port 45, a length of line $l_1$ and the equivalent two-port 50. The direct-coupled configuration is preferable due to its overall compactness and the fact that other, spurious passbands are further removed in frequency from the desired passband than they are for the quarter-wave-coupled filter.

The step-twist junction with corrective iris is particularly suitable for use as a discontinuity in a filter constructed in accordance with the invention because it has the general properties of the constant-phase two-port described above, and because its coefficients of reflection and transmission are readily varied by simply rotating the abutting guides forming the step-twist junction relative to each other. It has, in particular, been shown (see B. C. De Loach, Jr., "Step-Twist-Junction Wave-Guide Filters," March 1961, the Institute of Radio Engineering Transactions on Microwave Theory and Techniques) that of the various types of corrective irises, a centered, circular iris, whose diameter is equal to or smaller than the narrow dimension of the waveguide, is most advantageously used to provide the required constant-phase, two-port with the following restrictions: (1) $|R|$ cannot be varied from zero to unity but from some minimum value determined by the magnitude of the reflection coefficient of the circular iris alone when the two sections of waveguide are aligned; (2) $|R|$ and $\theta$ are not completely frequency independent; (3) $\theta$ becomes a slight function of $|R|$ at the low end of the nominal waveguide band.

(1) above, limits the maximum bandwidth attainable. (2) above, unbalances the symmetry of the filter response (on a $\beta$ plot) for wideband filters but in practice this is of little consequence due to the limitation in bandwidth due to (1). (2) also causes a decrease in obtainable bandwidth as one goes lower in frequency and an increase as one goes higher in frequency, in a given waveguide, due to the variation of $|R|$. (3) above, causes a detuning of the filter and it is therefore advantageous to use oversized waveguides for work near the lower end of the nominal waveguide band. This can also increase the maximum attainable bandwidth at these frequencies since the iris can also be made larger.

The transmission characteristics of a symmetrical, single cavity, step-twist-junction plus circular-iris filter are presented in FIG. 6. This is noted to have the property of variable bandwidth, but constant resonant frequency. A three cavity direct-coupled filter of the type shown in FIG. 1 was also constructed and operated and produced a tremendous variety of transmission characteristics. FIG. 7 and FIG. 8 are appropriate to illustrate these general characteristics. The curves of FIG. 7 were obtained by keeping the two end cavities 12 and 14 aligned, i.e., $\delta_1 = \delta_3 = 0$ in FIG. 1, and rotating the center cavity 13. This arrangement places the lowest values of $|R|$ that we can obtain for this filter at irises 15 and 18. Irises 16 and 17 can then be varied from this value of $|R|$, to $|R|=1$ as the center section is rotated. As can be seen from FIG. 7, a wide variety of transmission characteristics, including maximally flat, can be so synthesized.

The curves of FIG. 8 were obtained by keeping the two end cavities 12 and 14 set at 42 degrees of rotation, i.e., $\delta_1 = \delta_3 = 42°$ in FIG. 1, and rotating the center section 13. This configuration places higher values of $|R|$ at irises 15 and 18 and, thus, it is noted that the curve ($\delta_2 = 122°$) approximately corresponding to a maximally flat characteristic is much narrower than the corresponding curve in FIG. 7 ($\delta_2 = 75°$).

The resonant frequency is observed to remain fixed for all these variations in agreement with theory. If still narrower bandwidths are desired for the maximally flat curve or for the one decible ripple bandpass curve, the two end cavities are simply rotated through larger angles until the desired response is obtained.

Although no tuning screws were employed to obtain the results of FIGS. 7 and 8, it might be expected that due to mechanical dissimilarities and losses, some such fine tuning would be necessary for very narrow bandwidths. The tuning screws, when provided, can, of course, also be used to shift the characteristics of FIGS. 7 and 8 to lower frequencies should such operation be desired.

By employing an odd number of cavities and a symmetrical structure the external connecting sections of waveguide are always aligned. This prescription also always produces a passband at the frequencies given by $\theta - \beta l = k\pi$. While a rotation of the two external connecting sections of waveguide with respect to one another may be acceptable in certain applications, the advantages for general use of the symmetric, odd cavity configuration with connecting sections aligned are obvious.

The procedure for obtaining a given characteristic from a direct-coupled filter constructed in accordance with the invention is as follows. The desired degree of discrimination against frequencies not in the passband, or other pertinent considerations, is used to select the number of cavities desired. A waveguide cavity, bounded by a pair of spaced circular irises whose diameters are the same as, or less than, the height of the rectangular waveguide, is designed to be resonant at the desired center frequency of operation. The iris spacing so obtained is then maintained for all the cavities of the multiple-cavity filter. A holder is provided to contain the cavities and allow rotation. When assembled, the swept transmission and reflection characteristics are simultaneously monitored on a dual beam oscilloscope. Frequency markers and attenuation calibrations can then be utilized to synthesize the desired filter response.

While the illustrative embodiment shown in FIG. 1 utilizes circular irises, filters have been constructed in accordance with the teachings of the invention using other iris configurations. However, it appears from tests made using such other iris configurations (i.e., square or rectangular irises) that they are not as constant-phase as the circular irises and, hence, the center frequency tends to vary as a function of rotation. Similarly, in the illustrative embodiment all the cavities are tuned to the same center frequency. This, however, is not essential. Stagger tuning of the cavities can be utilized. However, stagger tuning tends to make the filter less flexible in that changing the filter response may require retuning the cavities as well as changing their angular rotation. Accordingly, the preferred arrangement is to use cavities tuned to the same frequency coupled through circular irises of equal diameter. It is, however, understood that the abovedescribed arrangement is merely illustrative of one of the many possible specific embodiments which can represent applications of the principles of the invention. Numerous and varied other arrangements can readily be devised for specific applications in accordance with these principles by those skilled in the art without departing from the spirit and scope of the invention.

What is claimed is:

1. In an electromagnetic wave transmission system, a direct-coupled, multiple cavity filter comprising a pair of fixed end sections and at least two inner sections of rectangular waveguide coaxially aligned along a common longitudinal axis with adjacent ends thereof abutting upon each other;

each of said inner sections of guide being rotatable about said axis relative to said pair of fixed end sections;

and conductive discontinuities disposed within said guides at each of said abutting ends.

2. A filter for electromagnetic wave energy comprising:

a pair of spaced fixed sections of rectangular waveguide coaxially aligned along a common longitudinal axis;

a plurality of inner sections of rectangular waveguide coaxially disposed along said common longitudinal axis between said fixed sections with the cofacing ends of said sections abutting upon each other to form a plurality of step-twist junctions;

each of said inner sections of guide being rotatable about said axis relative to said pair of spaced fixed section of waveguide;

means for rotating said inner sections about said axis;

and coupling means located between said sections comprising circular irises of equal diameter whose centers lie along said axis.

3. The combination according to claim 2 wherein; the diameter of said irises is equal to the narrow dimension of said rectangular guides.

4. The combination according to claim 2 wherein; said rotatable sections of waveguide are of equal length.

5. A direct-coupled filter for electromagnetic wave energy comprising:

at least three step-twist junctions wherein each junction is separated from the next adjacent junction by equal lengths of rectangular waveguide;

and coupling means located at said junctions comprising circular irises of equal diameter.

References Cited by the Examiner

UNITED STATES PATENTS 2,736,867  2/1956  Montgomery _____ 339—98 X
2,968,771  1/1961  De Loach _____ 333—73

OTHER REFERENCES

De Loach: IRE Transactions on Microwave Theory and Techniques, "Step-Twist-Junction Waveguide Filters," vol. MTT–9, No. 2, March 1961, pp. 130–135 (p. 134 relied on).

ELI LIEBERMAN, *Acting Primary Examiner.*

HERMAN KARL SAALBACH, *Examiner.*